United States Patent
Shin et al.

(10) Patent No.: US 12,314,604 B2
(45) Date of Patent: May 27, 2025

(54) DATA PROCESSING APPARATUS AND METHOD FOR ZSWAP ACCELERATION

(71) Applicant: Samsung Electronics Co., Ltd., Suwon-si (KR)

(72) Inventors: Youngsam Shin, Suwon-si (KR); Deok Jae Oh, Suwon-si (KR); Yeongon Cho, Suwon-si (KR); Seongwook Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 18/128,649

(22) Filed: Mar. 30, 2023

(65) Prior Publication Data

US 2024/0069810 A1     Feb. 29, 2024

(30) Foreign Application Priority Data

Aug. 26, 2022   (KR) .................. 10-2022-0107841

(51) Int. Cl.
  *G06F 3/06* (2006.01)
(52) U.S. Cl.
  CPC .......... *G06F 3/0659* (2013.01); *G06F 3/0608* (2013.01); *G06F 3/0656* (2013.01); *G06F 3/0673* (2013.01)
(58) Field of Classification Search
  CPC .... G06F 3/0659; G06F 3/0608; G06F 3/0656; G06F 3/0673; G06F 9/5016; G06F 3/0658; G06F 3/0679; G06F 12/0284; G06F 12/0868; G06F 12/0882; G06F 2209/509; G06F 2212/1024; G06F 2212/214; G06F 2212/261; G06F 2212/282; G06F 2212/284; G06F 2212/313; G06F 2212/401; G06F 12/04; G06F 12/08; G06F 3/0604; G06F 3/0631; G06F 3/0638; G06F 3/0683; G06F 3/0647

See application file for complete search history.

(56) References Cited

U.S. PATENT DOCUMENTS 6,523,102 B1 * 2/2003 Dye .................. G06F 12/08
                                                711/170
9,619,400 B2    4/2017 Devendran et al.
(Continued)

FOREIGN PATENT DOCUMENTS

JP   WO2016/071954 A1   5/2016
KR   10-2020-0056046 A   5/2020
(Continued)

OTHER PUBLICATIONS

D. Magenheimer, "In-kernel memory compression," LWN.net, Apr. 3, 2013, pp. 1-17 (see p. 1, line 1, through p. 7, line 29).
(Continued)

*Primary Examiner* — Zhuo H Li
(74) *Attorney, Agent, or Firm* — NSIP Law

(57) ABSTRACT

A data processing apparatus spaced apart from a host and configured to process data in a memory in conjunction with the host includes a near-memory processing unit configured to receive a command from the host, compress or decompress the data in response to the command, and manage an entry of the compressed data; and a buffer configured to store the data or the compressed data based on the entry.

23 Claims, 14 Drawing Sheets

(56) References Cited

U.S. PATENT DOCUMENTS

| | | | |
|---|---|---|---|
| 10,831,392 B2 | 11/2020 | Kim et al. | |
| 2006/0123035 A1* | 6/2006 | Ivie | H03M 7/30 |
| 2014/0173243 A1 | 6/2014 | Devendran et al. | |
| 2015/0242432 A1 | 8/2015 | Bak et al. | |
| 2017/0308319 A1* | 10/2017 | Suzuki | G06F 3/0659 |
| 2019/0056883 A1 | 2/2019 | Kim et al. | |
| 2020/0133549 A1* | 4/2020 | Armangau | G06F 3/067 |
| 2022/0012184 A1 | 1/2022 | Arelakis et al. | |
| 2022/0269407 A1* | 8/2022 | Wang | G06F 3/0608 |
| 2024/0134522 A1* | 4/2024 | Park | G06F 3/0658 |

FOREIGN PATENT DOCUMENTS

| | | | |
|---|---|---|---|
| KR | 10-2021-0086150 A | 7/2021 | |
| KR | 10-2379176 B1 | 3/2022 | |
| WO | WO-0180016 A2 * | 10/2001 | G06F 12/023 |

OTHER PUBLICATIONS

W. Cao and L. Ling, "Dynamic and Transparent Memory Sharing for Accelerating Big Data Analytics Workloads in Virtualized Cloud," *2018 IEEE International Conference on Big Data(IEEE BigData 2018)*, pp. 191-200, conference held Dec. 10-13, 2018, Seattle, Washington, paper presented on Dec. 11, 2018.

J. Kim, C. Kim, and E. Seo, "ezswap: Enhanced Compressed Swap Scheme for Mobile Devices," *IEEE Access*, vol. 7, pp. 139678-139691, 2019, received Aug. 21, 2019, accepted Sep. 16, 2019, date of publication Sep. 19, 2019, date of current version Oct. 7, 2019.

Extended European Search report issued on Feb. 7, 2024, in counterpart European Patent Application No. 23180634.0 (15 pages).

Korean Office Action issued on Sep. 27, 2024, in counterpart Korean Patent Application No. 10-2022-0107841 (2 pages in English, 5 pages in Korean).

* cited by examiner

DATA PROCESSING APPARATUS AND METHOD FOR ZSWAP ACCELERATION

CROSS-REFERENCE TO RELATED APPLICATIONS

This application claims the benefit under 35 USC 119(a) of Korean Patent Application No. 10-2022-0107841 filed on Aug. 26, 2022, in the Korean Intellectual Property Office, the entire disclosure of which is incorporated herein by reference for all purposes.

BACKGROUND

1. Field

The following description relates to a data processing apparatus and method for zSwap acceleration.

2. Description of Related Art

Swap is a memory management technique that solves a memory shortage by moving a portion of memory allocated to an application program to an auxiliary storage device (e.g., a solid-state drive (SSD) or a hard disk drive (HDD)) with a relatively large capacity when a main memory area to be allocated to the application program is insufficient in a system.

When a main memory area in a system is insufficient, an operating system may secure a main memory space by moving data in a memory area already allocated to an application program (e.g., pages in a Linux system that uses a virtual memory) to a swap area of a non-volatile memory used as an auxiliary storage device, thereby alleviating a memory shortage.

The cost of moving data (e.g., pages) to an auxiliary storage device is considerable. Data needs to be transmitted through a relatively slow system bus compared to the main memory, and the stored data needs to be retrieved to the main memory if needed. In this case, the performance of an application program may be degraded.

In order to prevent such degradation in performance, a data processing method of compressing data and storing the compressed data in a main memory for use, rather than moving the data to an auxiliary storage device, may be used.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a data processing apparatus spaced apart from a host and configured to process data in a memory in conjunction with the host includes a near-memory processing unit configured to receive a command from the host, compress or decompress the data in response to the command, and manage an entry of the compressed data; and a buffer configured to store the data or the compressed data based on the entry.

The command may include a swap-in command or a swap-out command with respect to the data or the compressed data stored in the buffer.

The near-memory processing unit may be further configured to generate an entry tree configured in a tree structure or a hash structure based on the compressed data, and manage the entry based on the entry tree.

The buffer may include an input buffer and an output buffer, and the near-memory processing unit may be further configured to receive information on data stored in the input buffer from the host and read the data from the input buffer, and write the data to the output buffer and output information on the written data to the host.

The near-memory processing unit may be further configured to, in response to a swap-out command being received from the host, set a swap-out parameter based on the swap-out command, determine whether to compress data based on the swap-out parameter, allocate an area to store the compressed data, and update the entry based on the swap-out parameter and the area.

The swap-out parameter may include a type of the data, an offset of the data, and whether to compress the data.

The near-memory processing unit may be further configured to generate the entry based on an address of the area, a type of the data, and an offset of the data, and update the entry by inserting the entry into an entry tree.

The near-memory processing unit may be further configured to, in response to a swap-in command being received from the host, set a swap-in parameter based on the swap-in command, retrieve the compressed data based on the swap-in parameter, decompress the compressed data, and output the decompressed data to a predetermined memory area.

The near-memory processing unit may be further configured to retrieve the compressed data based on a type of the compressed data and an offset of the compressed data.

The near-memory processing unit may be further configured to decompress the compressed data based on a decompression option of the compressed data included in the swap-in parameter.

The near-memory processing unit may be further configured to delete an entry corresponding to the decompressed data from an entry tree.

The near-memory processing unit may be further configured to store the data or the decompressed data in a near memory area.

In another general aspect, a data processing method for processing data in a memory in conjunction with a host at a point spaced apart from the host incudes receiving a command from the host; compressing or decompressing the data in response to the command; managing an entry of the compressed data; and storing the data or the compressed data in a buffer based on the entry.

The command may include a swap-in command or a swap-out command with respect to the data or the compressed data stored in the buffer.

The managing of the entry may include generating an entry tree configured in a tree structure based on the compressed data; and managing the entry based on the entry tree.

The storing may include receiving information on data stored in an input buffer from the host and reading the data from the input buffer; and writing the data to the output buffer and outputting information on the written data to the host.

In response to a swap-out command being received from the host, the compressing or decompressing of the data may include setting a swap-out parameter based on the swap-out command; and determining whether to compress data based on the swap-out parameter, and the managing of the entry may include allocating an area to store the compressed data; and updating the entry based on the swap-out parameter and the area.

The swap-out parameter may include a type of the data, an offset of the data, and whether to compress the data.

The updating of the entry may include generating the entry based on an address of the area, a type of the data, and an offset of the data; and updating the entry by inserting the entry into an entry tree.

The compressing or decompressing of the data may include, in response to a swap-in command being received from the host, setting a swap-in parameter based on the swap-in command; retrieving the compressed data based on the swap-in parameter; and decompressing the compressed data, and the managing of the entry may include outputting the decompressed data to a predetermined memory area.

The retrieving of the compressed data may include retrieving the compressed data based on a type of the compressed data and an offset of the compressed data.

The decompressing may include decompressing the compressed data based on a decompression option of the compressed data included in the swap-in parameter.

The managing of the entry may further include deleting an entry corresponding to the decompressed data from an entry tree.

The data processing method may further include storing the data or the decompressed data in a near memory area.

In another general aspect, a non-transitory computer-readable storage medium stores instructions that, when executed by a processor, cause the processor to perform the data processing method described above.

Other features and aspects will be apparent from the following detailed description, the drawings, and the claims.

BRIEF DESCRIPTION OF THE DRAWINGS

Throughout the drawings and the detailed description, the same drawing reference numerals refer to the same elements. The drawings may not be to scale, and the relative size, proportions, and depiction of elements in the drawings may be exaggerated for clarity, illustration, and convenience.

DETAILED DESCRIPTION

Figure 1:
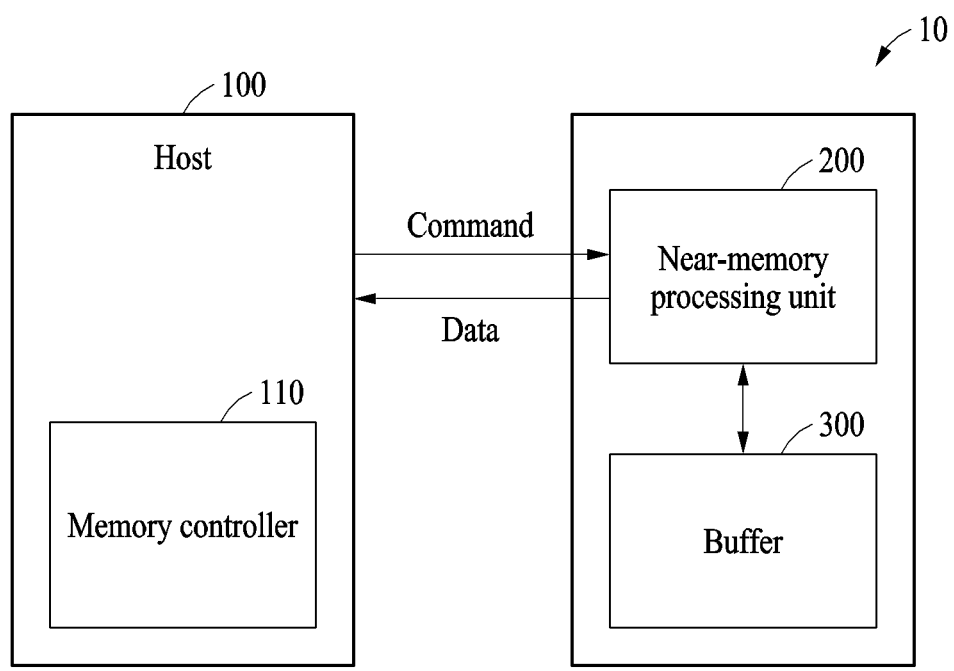
FIG. 1 illustrates an example of a data processing apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

As used in connection with the present disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example, the module may be implemented in a form of an application-specific integrated circuit (ASIC).

The term "unit" or the like used herein may refer to a software or hardware component, such as a field-programmable gate array (FPGA) or an application-specific integrated circuit (ASIC), and the "unit" performs predefined functions. However, "unit" is not limited to software or hardware. The "unit" may be configured to reside on an addressable storage medium or configured to operate one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate on one or more central processing units (CPUs) within a device or a security multimedia card. In addition, "unit" may include one or more processors.

FIG. 1 illustrates an example of a data processing apparatus.

Referring to FIG. 1, a data processing apparatus 10 may process data. The data processing apparatus 10 may manage a memory by processing data stored in the memory.

The memory may store instructions (or programs) executable by the processor. For example, the instructions may include instructions for executing an operation of the processor and/or instructions for performing an operation of each component of the processor.

The memory may be implemented as a volatile memory device or a non-volatile memory device.

The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory.

The data processing apparatus 10 may manage the memory by performing a swap. A swap may refer to a memory management method that solves a memory shortage by moving a portion of memory allocated to an application program to an auxiliary storage device (e.g., a solid-state drive (SSD) or a hard disk drive (HDD)) with a relatively large capacity when a main memory area to be allocated to the application program is insufficient in a computing system.

The data processing apparatus 10 may manage the memory by performing a zSwap. A zSwap may refer to a method that compresses swap data and stores the compressed data in a predetermined area of a main memory when a memory area is insufficient. When the zSwap method is used, the data processing apparatus 10 may compress data to be moved to a swap area and store the compressed data in a zSwap pool area of the main memory, and decompress and reuse the data in the main memory, if the data is needed.

In the zSwap process, the data processing apparatus 10 may compress data and process an operation for managing a memory to store the compressed data to be located in the memory or a near memory not in a host, thereby improving the overall processing rate of an application program.

The data processing apparatus 10 may be spaced apart from a host 100. The data processing apparatus 10 may be implemented in the memory or close to the memory. Being implemented close to the memory may indicate that the data processing apparatus 10 is implemented at a location that allows access to the data stored in the memory other than through a main data bus between the host 100 and the memory. The data processing apparatus 10 may be implemented close to the memory to process data other than through the main data bus between the host and the memory, thereby processing the data quickly.

The host 100 may be a main management entity of a computer system. The host 100 may be implemented as a central processing unit (CPU) or a server. The host 100 may include a memory controller 110. The memory controller 110 may control the memory. The memory controller 110 may transmit a command to the data processing apparatus 10.

The data processing apparatus 10 may process the data in the memory in conjunction with the host 100. The data processing apparatus 10 may control the memory in response to a command from the host 100. The data processing apparatus 10 includes a near-memory processing unit 200 and a buffer 300.

The buffer 300 may store data. The buffer 300 may include an input buffer and an output buffer.

The near-memory processing unit 200 may include a processor. The processor may process data stored in a memory. The processor may execute computer-readable code (e.g., software) stored in the memory and instructions triggered by the processor.

The "processor" may be a data processing apparatus implemented by hardware including a circuit having a physical structure to perform desired operations. The desired operations may include, for example, code or instructions included in a program.

The hardware-implemented data processing apparatus may include, for example, any one or any combination of any two or more of a microprocessor, a central processing unit (CPU), a processor core, a multi-core processor, a multiprocessor, an application-specific integrated circuit (ASIC), and a field-programmable gate array (FPGA).

The near-memory processing unit 200 may receive a command from the host 100. The command may include a swap-in command and a swap-out command with respect to the data or compressed data stored in the buffer 300. The operation of the near-memory processing unit 200 according to the swap-in command and the swap-out command will be described in detail with reference to FIGS. 4 and 5.

The near-memory processing unit 200 may compress or decompress the data in response to the command. The near-memory processing unit 200 may manage an entry of the compressed data.

The near-memory processing unit 200 may generate an entry tree configured in a tree structure or a hash structure based on the compressed data. The near-memory processing unit 200 may manage the entry based on the entry tree.

The near-memory processing unit 200 may receive information on data stored in the input buffer from the host 100 and read the input buffer. The near-memory processing unit 200 may write data to the output buffer and output information on the written data to a predetermined memory area. For example, the predetermined memory area may include a main memory area of the host 100, a second memory area such as a compute express link (CXL), or a memory area of near-data processing (NDP).

In response to a swap-out command being received from the host 100, the near-memory processing unit 200 may set a swap-out parameter based on the swap-out command. The swap-out parameter may include a type of the data, an offset of the data, and whether to compress the data. The offset may be address information including page information.

The near-memory processing unit 200 may determine whether to compress data based on the swap-out parameter. The near-memory processing unit 200 may allocate an area to store the compressed data.

The near-memory processing unit 200 may update the entry based on the swap-out parameter and the area to store the compressed data. The near-memory processing unit 200 may generate the entry based on an address of the area to store the compressed data, a type of the data, and an offset of the data. The near-memory processing unit 200 may update the entry by inserting the entry into the entry tree.

In response to a swap-in command being received from the host 100, the near-memory processing unit 200 may set a swap-in parameter based on the swap-in command. The near-memory processing unit 200 may retrieve the compressed data based on the swap-in parameter. The near-memory processing unit 200 may retrieve the compressed data based on a type of the compressed data and an offset of the compressed data.

The near-memory processing unit 200 may decompress the compressed data. The near-memory processing unit 200 may decompress the compressed data based on a decompression option of the compressed data included in the swap-in parameter.

The near-memory processing unit 200 may output the decompressed data to the host 100.

The near-memory processing unit 200 may delete an entry corresponding to the decompressed data from the entry tree.

The near-memory processing unit 200 may store the data or the compressed data in the buffer 300 based on the entry.

The near-memory processing unit 200 may store the data or the decompressed data in a near memory area. The near memory area may refer to a storage space accessible by the near-memory processing unit 200 other than through the main data bus between the host 100 and the memory.

Figure 2:
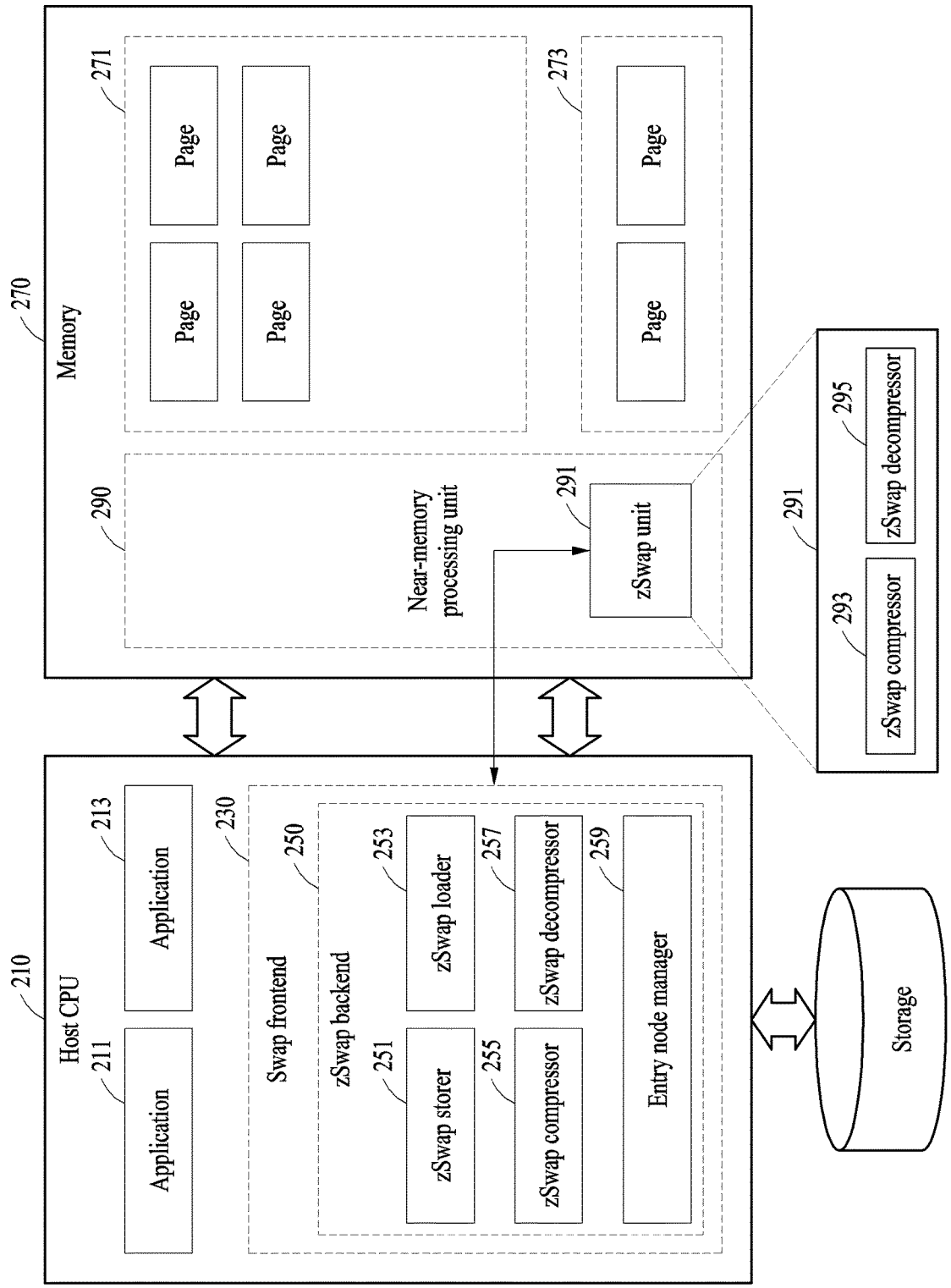
FIG. 2 illustrates an example of implementation of the data processing apparatus of FIG. 1.

FIG. 2 illustrates an example of implementation of the data processing apparatus of FIG. 1.

Referring to FIG. 2, a host CPU 210 may execute a plurality of application programs 211 and 213. The host CPU 210 may manage data in a memory 270 to execute the plurality of application programs 211 and 213.

The host CPU 210 may include a swap frontend interface 230 and a zSwap backend interface 250. The zSwap backend interface 250 may include a zSwap storer 251, a zSwap loader 253, a zSwap compressor 255, a zSwap decompressor 257, and an entry node manager 259.

The memory 270 may include a near-memory processing unit 290, a normal memory area 271, and a compressed memory area 273. The near-memory processing unit 290 may include a zSwap unit 291. The zSwap unit 291 may include a zSwap near-data processing (NDP) backend. The zSwap NDP backend may include a zSwap compressor 293 and a zSwap decompressor 295. The zSwap NDP backend may optionally include a zSwap storer, a zSwap loader, and an entry node manager like the zSwap storer 251, the zSwap loader 253, and the entry node manager 259 of the zSwap backend interface 250 of the host CPU 210. For example, the zSwap NDP backend may include any one or any combination of any two or more of the zSwap compressor 293, the zSwap decompressor 295, the zSwap storer, the zSwap loader, and the entry node manager.

The near-memory processing unit 290 may operate in the same manner as the near-memory processing unit 200 of FIG. 1.

Data of the plurality of application programs 211 and 213 may be stored in a main memory (e.g., the memory 270) on a page basis (e.g., a 4-KB basis). When a portion of these pages is moved to the swap area, the data may be processed through the swap frontend interface 230. The data processing apparatus 10 may process data by compressing and storing the data in the compressed memory area 273 of the main memory before the data is moved to an auxiliary storage device such as an SSD.

The near-memory processing unit 290 may compress data in the zSwap compressor 293 through a zswap-offload-store command and store the compressed data in the memory. The near-memory processing unit 290 may use the entry node manager 259 to be allocated a compressed memory space to store the data. The entry node manager 259 may include a zswap-alloc/tree module.

In a case where continuous memory demands from other devices cause a high memory load, the near-memory processing unit 290 may secure a main memory space for an application program by moving the data stored in the compressed memory area 273 to an auxiliary swap area such as an SSD.

The near-memory processing unit 290 may read compressed data stored in the compressed memory area 273 through a zswap-offload-load command and decompress the compressed data through the zSwap decompressor 295. The near-memory processing unit 290 may move the decompressed data to a swap area of the auxiliary storage device according to the swap procedure of the operating system.

The data processing apparatus (e.g., the data processing apparatus 10 of FIG. 1) may perform compression, decompression, and memory area management functions that require a large memory bandwidth during the swap process. The data processing apparatus 10 may be implemented inside or close to the memory 270 to perform the compression, decompression, and memory area management functions, thereby efficiently processing data.

For example, the data processing apparatus 10 may be implemented in a memory buffer of a dual in-line memory module (DIMM) to process data. In this case, the near-memory processing unit 290 may process data while efficiently using the internal bandwidth of the DIMM.

The near-memory processing unit 290 may distribute computing functions so that a plurality of DIMMs may process data in parallel for each memory rank. Through this, the near-memory processing unit 290 may prevent data access latency with respect to the compressed memory area 273 and effectively reduce external bus traffic.

The swap frontend interface 230 may use the zSwap acceleration function of the near-memory processing unit 290 using the zSwap backend interface 250. The zSwap backend interface 250 may provide an interface for zSwap acceleration for compatibility with the operating system.

The zSwap backend interface 250 may provide a zSwap acceleration function using a command set (e.g., a zswap frontswap ops support command set).

The command set may include zswap offload store, zswap_offload_load, zswap_offload_invalidate_page, zswap_offload_invalidate_area, and zswap_offload_init.

The near-memory processing unit 290 may perform an operation of compressing data on a page to be swapped-out in response to the zswap_offload_store command and storing the compressed data in the compressed memory area 273. The near-memory processing unit 290 may compress the data on the page to be swapped out from the main memory through the zSwap compressor 293. The near-memory processing unit 290 may allocate a space corresponding to a compressed size to the compressed memory through the entry node manager 259, and store the compressed data in the allocated space. The near-memory processing unit 290 may update meta information of the compressed page through a zSwap-tree module of the entry node manager 259.

The near-memory processing unit 290 may decompress data on a page to be swapped-in in response to the zswap_offload_load command and store the compressed data in the main memory. The near-memory processing unit 290 may search for a storage location of the compressed data to be swapped-in in the compressed memory through the zSwap-tree module. The near-memory processing unit 290 may decompress the compressed data through the zSwap decompressor 295 and store the data in the main memory again. The near-memory processing unit 290 may release a space corresponding to a compressed size from the compressed memory through the entry node manager 259 and initialize meta information of the swapped-in page.

The near-memory processing unit 290 may delete meta information of the swapped-out page in response to the zswap_offload_invalidate_page command. The near-memory processing unit 290 may search a swap area designated as a type, delete meta information of a page designated as an offset through the entry node manager 259, and release the allocated memory space.

The near-memory processing unit 290 may generate one swap area in response to the zswap_offload_init command. The near-memory processing unit 290 may release all of the memory space allocated to the swap area designated as the type through the entry node manager 259.

Figure 3:
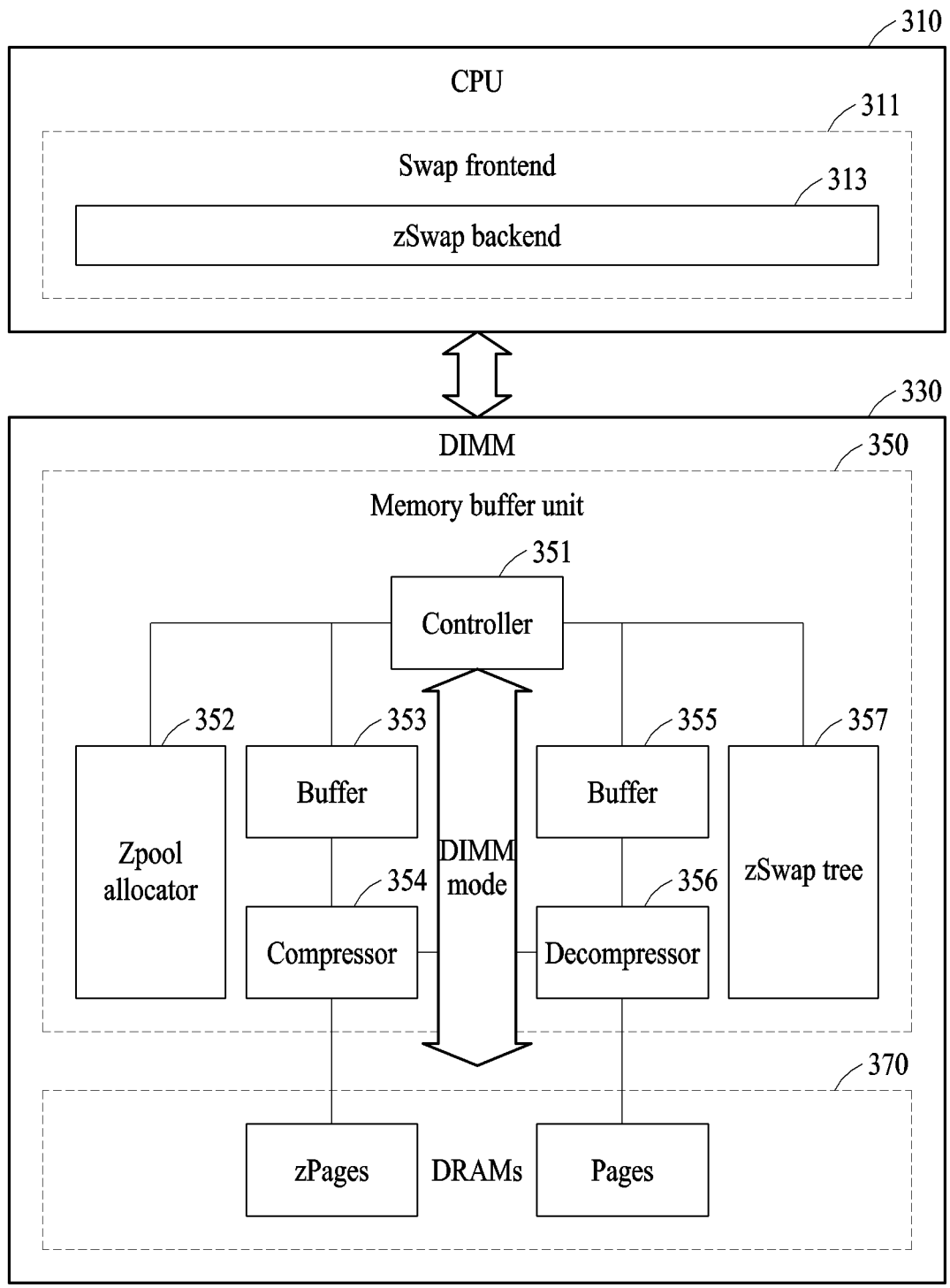
FIG. 3 illustrates an example of implementation of the data processing apparatus of FIG. 1.

FIG. 3 illustrates an example of implementation of the data processing apparatus of FIG. 1.

FIG. 3 shows an example in which a data processing apparatus (e.g., the data processing apparatus 10 of FIG. 1) is implemented in one DIMM.

In the example of FIG. 3, a host may be a CPU 310. The CPU 310 may transmit a command to a DIMM 330, and the DIMM 330 may process data based on the received command.

The DIMM 330 may include a memory buffer unit 350 and a DRAM 370. The memory buffer unit 350 may include a controller 351, a zpool allocator 352, a buffer 353, a compressor 354, a buffer 355, a decompressor 356 and a zSwap tree 357.

The controller 351 may operate in the same manner as a memory controller (e.g., the near-memory processing unit 200 of FIG. 1). The buffer 353 may operate as an input buffer and the buffer 355 may operate as an output buffer. The zpool allocator 352 and the zSwap tree 357 may operate in the same manner as an entry node manager (e.g., the entry node manager 259 of FIG. 2). The compressor 354 may operate in the same manner as a zSwap compressor (e.g., the zSwap compressor 255 of FIG. 2). The decompressor 356 may operate in the same manner as a zSwap decompressor (e.g., the zSwap decompressor 257 of FIG. 2).

The memory buffer unit 350 may operate in a DIMM mode for processing commands of the DIMM, and an accelerator dual in-line memory module (mode (AxDIMM mode) for zSwap acceleration.

The DIMM mode may be a mode for normal DIMM access, and the AxDIMM mode may be a mode for DIMM access for zSwap acceleration.

The memory buffer unit 350 may use a predetermined area of a DIMM memory address as a control address for changing the mode. For example, the memory buffer unit 350 may designate a DIMM mode configuration (DIMM-MODE-CONFIG) as the control address for changing the mode.

When DIMM-MODE-CONFIG=AXDIMM-MODE, the memory buffer unit 350 may perform a command processing function for zSwap acceleration. The memory buffer unit 350 may define a DIMM mode status (DIMM-MODE-STATUS) area. The DIMM mode status area may allow the host (e.g., the CPU 310) to identify a current status of the DIMM.

Possible states recorded in the DIMM mode status area may include a current mode and an AxDIMM status. The AxDIMM status may be a status of being capable of cooperating with the host, such as CMD Done, BUSY, READY, or IDLE.

The controller 351 may process a zSwap command received from the CPU 310. In response to a zSwap store command being received, the controller 351 may compress a page and store the compressed data in a compressed memory area received through the zpool allocator 352. The controller 351 may add an entry of a newly added compressed memory to a tree including zSwap page meta information.

In response to a zSwap load command, the controller 351 may acquire the location of information on a node to be swapped-in in the compressed memory through the tree, read and decompress the compressed data, and store the decompressed data in a normal memory area. The controller 351 may remove the entry of the decompressed zSwap page from the entry tree.

Figure 4:
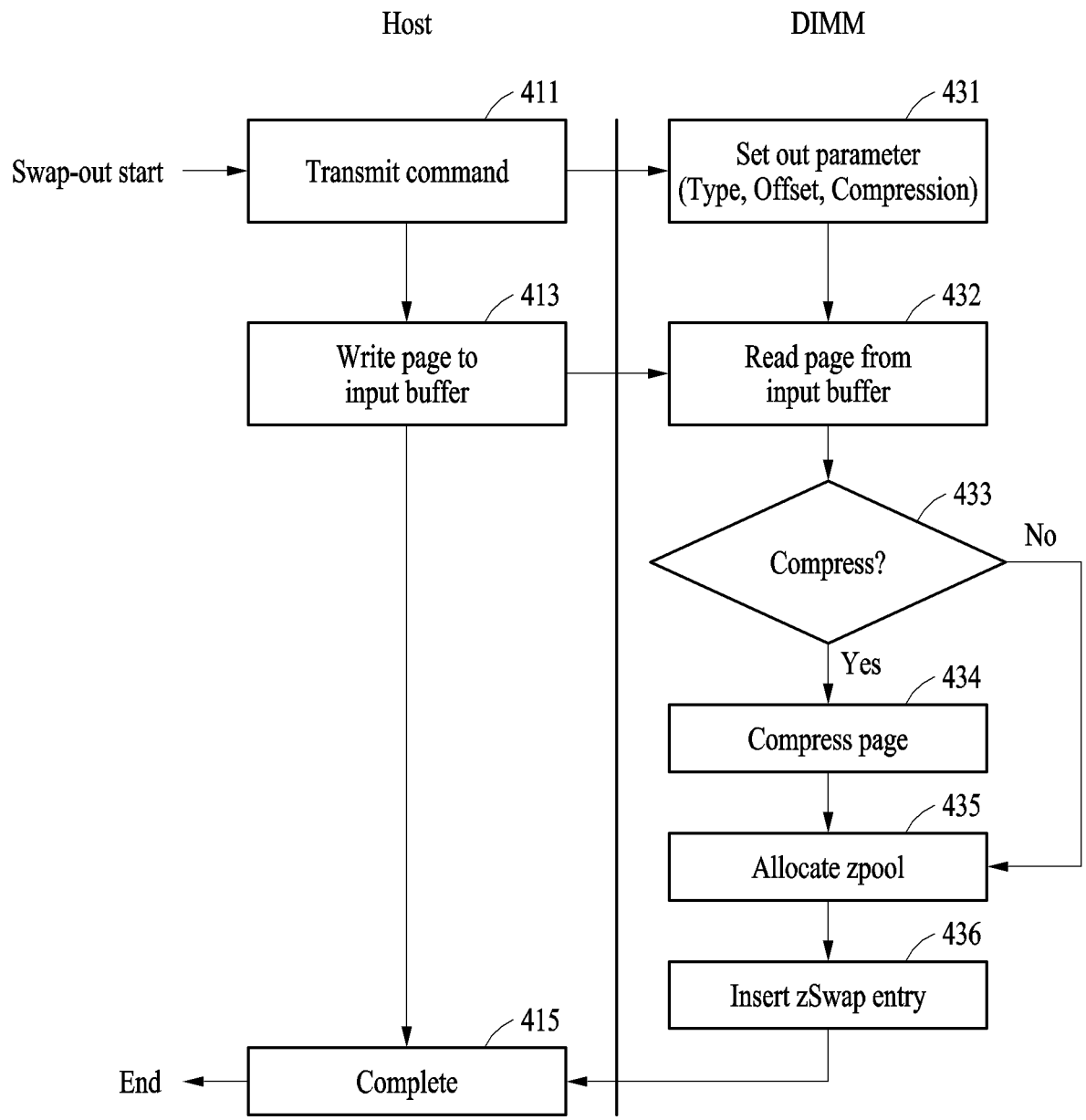
FIG. 4 illustrates an example of an operation of a data processing apparatus corresponding to a swap-out command.

FIG. 4 illustrates an example of an operation of a data processing apparatus corresponding to a swap-out command.

Referring to FIG. 4, a data processing apparatus (e.g., the data processing apparatus 10 of FIG. 1) may be implemented in a DIMM (or an AxDIMM).

In operation 411, a host may transmit a command to the DIMM when a swap-out starts. The host may transmit a zswap-offload-store command to the AxDIMM along with information including a type of data (e.g., a page) to be compressed, an offset of the data, and whether to compress the data. In operation 413, the host may write the page to an input buffer of the DIMM.

In operation 431, a memory controller (e.g., the near-memory processing unit 200 of FIG. 1) of the DIMM may set an out parameter in response to the command from the host. In response to the writing of the page into the input buffer being completed in operation 413, the near-memory processing unit 200 may read the page from the input buffer in operation 432.

In operation 433, the near-memory processing unit 200 may decrypt the command to determine whether to compress the data. In response to compression being needed, the near-memory processing unit 200 may compress the page through a zSwap compressor in operation 434. In response to compression not being needed, the near-memory processing unit 200 may perform zpool allocation in operation 435.

Specifically, the near-memory processing unit 200 may be allocated a memory space through the zpool allocator to store the compressed page in the compressed memory space, and store the compressed page at the allocated address.

In operation 436, the near-memory processing unit 200 may insert the memory address at which the compressed page was stored, a type of the compressed page, and offset information of the compressed page into the tree.

Figure 5:
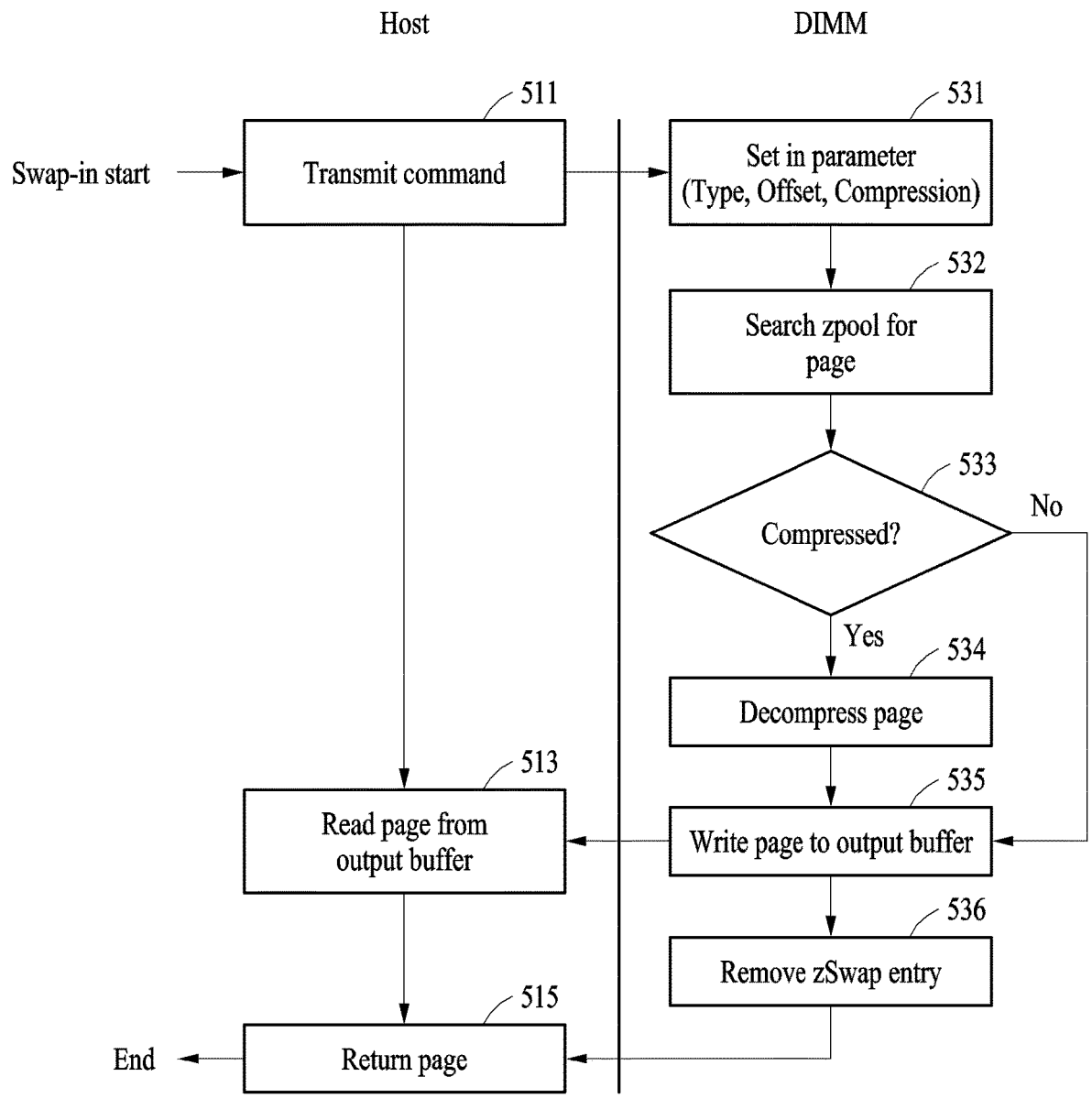
FIG. 5 illustrates an example of an operation of a data processing apparatus corresponding to a swap-in command.

FIG. 5 illustrates an example of an operation of a data processing apparatus corresponding to a swap-in command.

Referring to FIG. 5, a data processing apparatus (e.g., the data processing apparatus 10 of FIG. 1) may be implemented in a DIMM (or an AxDIMM).

In operation 511, a host may transmit a command to the DIMM when a swap-in starts. The host may transmit a type of a page, an offset of the page, information regarding whether to decompress the page, and a zswap-offload-load command to the AxDIMM.

In operation 513, the host may read data from a memory in which compressed data corresponding to the type and the offset is stored through a zpool allocator.

In operation 531, a memory controller (e.g., the near-memory processing unit 200 of FIG. 1) of the DIMM may set an in parameter. The near-memory processing unit 200 may decrypt the command from the host to identify whether to decompress the data and whether to compress the data.

In operation 532, the near-memory processing unit 200 may search a zpool for the page. In operation 533, the near-memory processing unit 200 may determine whether the found page is compressed.

In respond to the data being compressed and needing to be decompressed, the near-memory processing unit 200 may decompress the page through a zSwap decompressor in operation 534.

In response to data not being compressed or a decompression option not being set, the near-memory processing unit 200 may write the page to an output buffer in operation 535. Further, in operation 535, the near-memory processing unit 200 may write the decompressed page to the output buffer to transmit the decompressed page to the host.

In response to the page or the decompressed page being written to the output buffer in operation 535, the host may read the page from the output buffer in operation 513, and return the page in operation 515.

In operation 536, the near-memory processing unit 200 may delete (or remove) a zswap entry.

Figure 6:
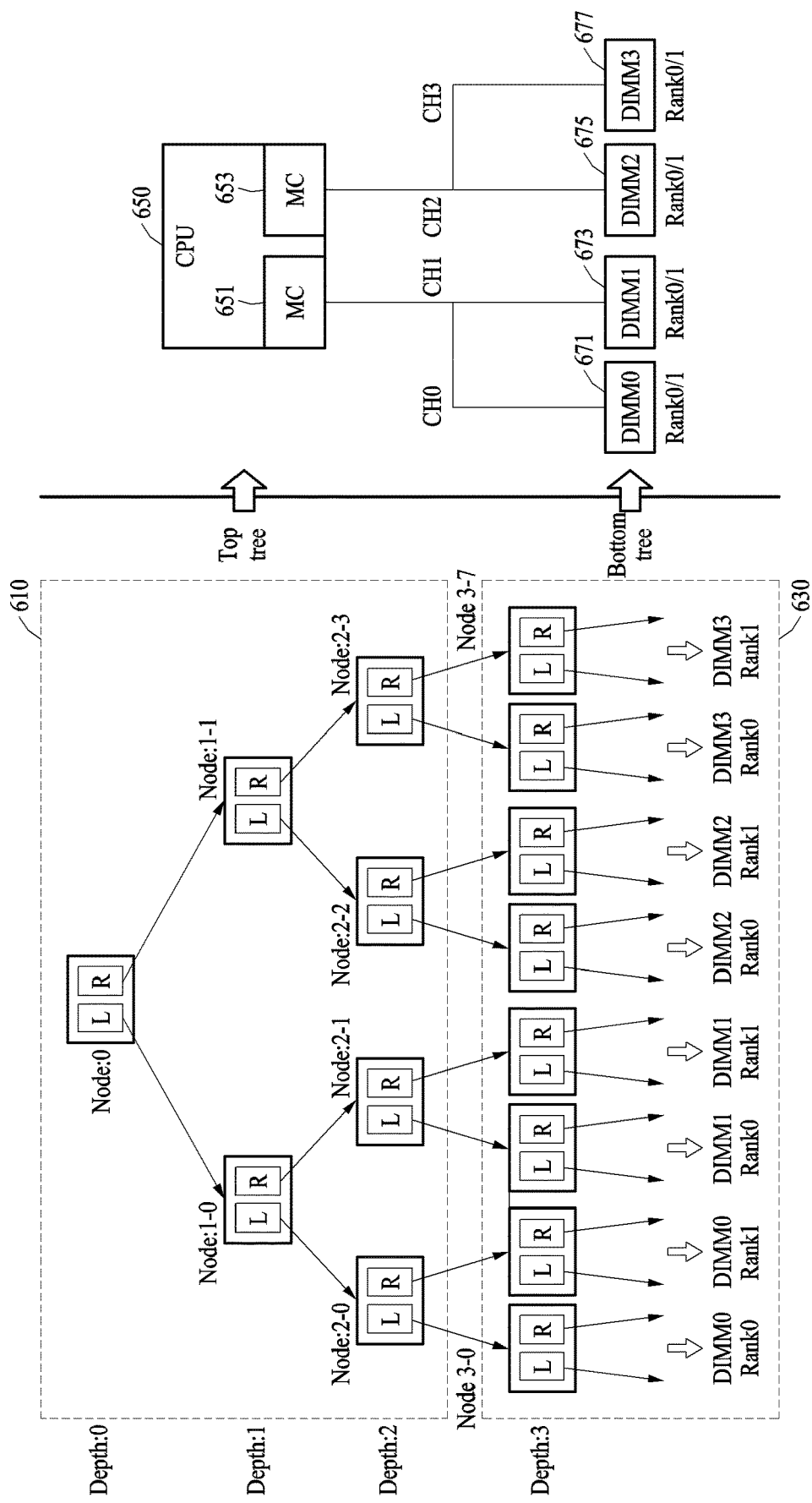
FIG. 6 illustrates an example of a tree structure for parallel processing acceleration in data processing.

FIG. 6 illustrates an example of a tree structure for parallel processing acceleration in data processing.

Referring to FIG. 6, a near-memory processing unit (e.g., the near-memory processing unit 200 of FIG. 1) may manage data using an entry tree of a tree structure or a hash structure. The near-memory processing unit 200 may manage a zSwap tree using a binary tree. The near-memory processing unit 200 may use a red/black tree algorithm for tree balancing.

When a large-capacity main memory such as CXL memory is used, the tree structure may greatly expand. When the tree structure expands, considerable computing resources and memory access may be required for tree search and management.

The near-memory processing unit 200 may be implemented in a dedicated accelerator positioned in or close to a memory module and use an internal memory bandwidth through tree management. The near-memory processing unit 200 may accelerate the tree management function by separating the tree into a top tree 610 and a bottom tree 630 and dividing and allocating the bottom tree 630 into as many lower nodes as there are ranks to process data in parallel.

The top tree 610 and the bottom tree 630 may be separated according to a rank parallelism level of an available DIMM. Nodes corresponding to the top tree 610 may be processed by a CPU 650. The CPU 650 may include a plurality of memory controllers 651 and 653.

Accelerator units 671, 673, 675, and 677 that are independent for each DIMM may process searching and managing the lower nodes of the bottom tree 630, thereby maximizing parallel processing acceleration. The accelerator units 671, 673, 675, and 677 may each include a data processing apparatus (e.g., the data processing apparatus 10 of FIG. 1).

Alternatively, according to an example, the top tree 610 may also be processed by a common unit of a dedicated accelerator of a memory buffer.

Figure 7:
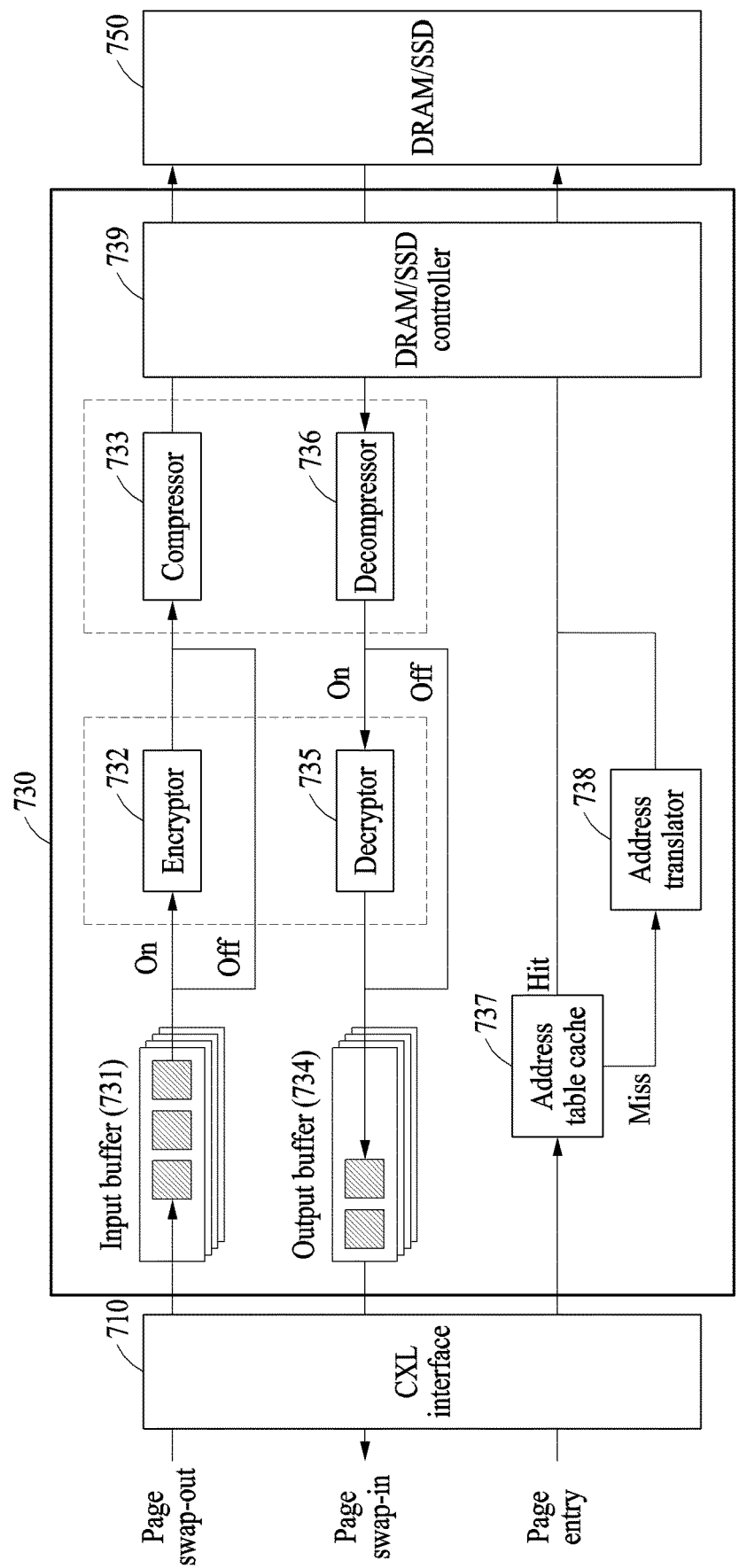
FIG. 7 illustrates an example of a zSwap structure using a compute express link (CXL) memory and a solid state drive (SSD).

FIG. 7 illustrates an example of a zSwap structure using a compute express link (CXL) memory and a solid-state drive (SSD).

Referring to FIG. 7, a data processing apparatus 730 (e.g., the data processing apparatus 10 of FIG. 1) may be applied to a CXL memory or a CXL/SSD structure.

Even when applied to the CXL memory, the data processing apparatus 730 may operate in a similar manner as when applied to a DIMM. Since the CXL memory and the CXL/SSD structure share the same CXL interface, only the operation of the data processing apparatus 10 in the CXL memory will be described below.

The data processing apparatus 730 may be implemented in the CXL memory to perform zSwap acceleration. The data processing apparatus 730 may include an input buffer 731, an encryptor 732, a compressor 733, an output buffer 734, a decryptor 735, a decompressor 736, an address table cache 737, an address translator 738, and a DRAM/SSD controller 739. The data processing apparatus 730 may receive a command from the host through a CXL interface 710 and output a page to the host.

The input buffer 731 may temporarily store input data. The output buffer 734 may temporarily store output data. The encryptor 732 may encrypt data. The decryptor 735 may decrypt data. The compressor 733 may compress data. The decompressor 736 may decompress compressed data. The address translator 738 may translate to an address of an internal memory module using information in the input and output data. The address table cache 737 may temporarily store address translation information.

The address table cache 737 and the address translator 738 may be included in the entry node manager 259 of FIG. 2.

In a swap-out, the host may compose a type of a final swap space of a page to be swapped-out, an offset that is location information of the page to be stored, and information regarding whether to encrypt data and whether to compress data in a single command and transmit the command to the data processing apparatus 730.

The data processing apparatus 730 may translate a type of the command and the offset information to a memory address at which the page to be swapped-out is to be stored through the address translator 738.

The page to be swapped-out may be stored in the input buffer 731, and may be encrypted or compressed through the encryptor 732 and the compressor 733 according to whether to encrypt and whether to compress included in the command received in advance. The data processing apparatus 730 may store the compressed page in the translated memory address.

In a swap-in, the data processing apparatus 730 may receive a command including a type and an offset from the host. The data processing apparatus 730 may search the address table cache 737 for a memory address at which a swap-in page is stored. The address table cache 737 may store information on an address, whether data is encrypted, whether data is compressed, and a size of data stored.

According to whether data is encrypted and whether data is compressed, the data processing apparatus 730 may decompress the data through the decompressor 736 and decrypt the decompressed data through the decryptor 735. The data processing apparatus 730 may store the decrypted data in the output buffer 734 and return the data to the host.

The data processing apparatus 730 may process the operation of the zpool allocator and the tree structure for managing swap page information needed to manage a zswap space through the address translator 738, thereby improving the data processing performance. The data processing apparatus 730 may further improve the data processing performance by storing address translation information of a frequently accessed swap page in the address table cache 737.

The data processing apparatus 730 may accelerate the zSwap operation of the CXL memory or the CXL/SSD structure providing a large-capacity memory, thereby guaranteeing the performance of an application program requiring a large amount of memory while effectively increasing the swap space.

Figure 8:
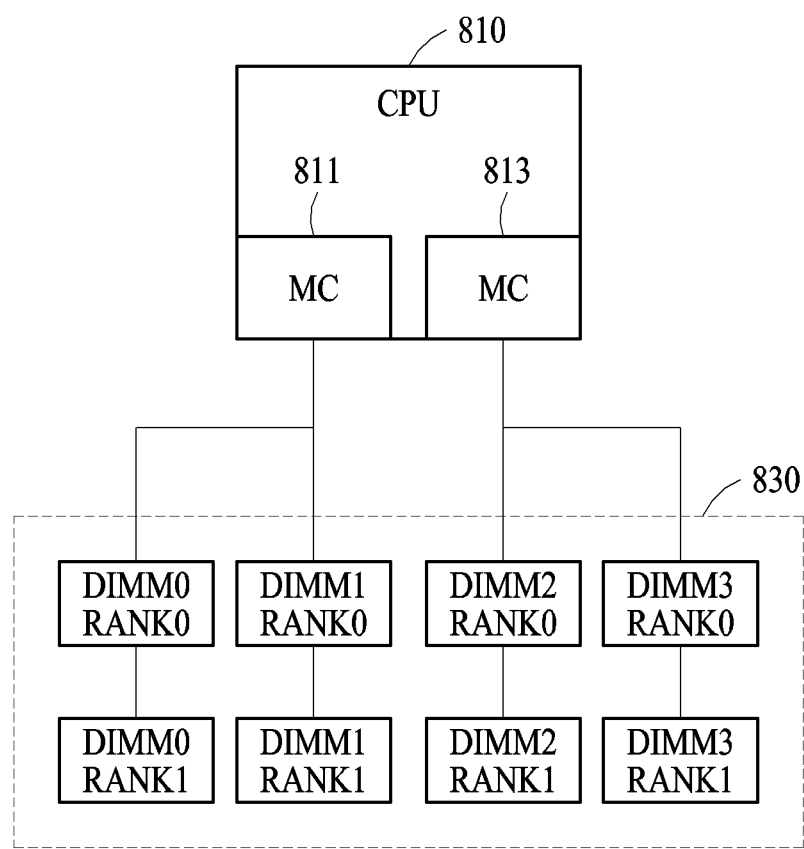
FIG. 8 illustrates an example of a CPU-based zSwap dual in-line memory module (DIMM) acceleration structure.
Figure 9:
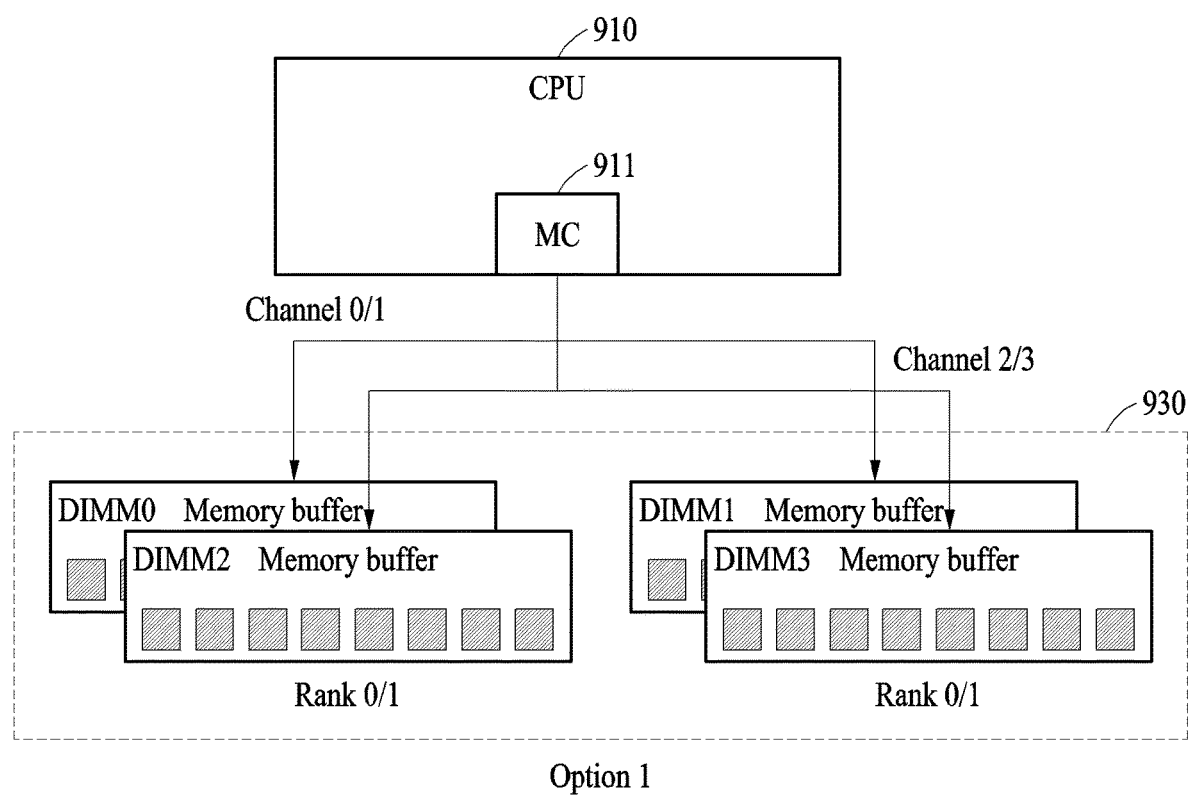
FIG. 9 illustrates an example of a DIMM-based multi-rank structure.

FIG. 8 illustrates an example of a CPU-based zSwap DIMM acceleration structure, and FIG. 9 illustrates an example of a DIMM-based multi-rank structure.

Referring to FIGS. 8 and 9, a host may be implemented as a CPU 810. The CPU 810 may include a plurality of memory controllers 811 and 813. The CPU 810 may process data in a plurality of memory modules 830 through the plurality of memory controllers 811 and 813.

When a main memory includes the plurality of memory modules 830 capable of AxDIMM zSwap acceleration, the zSwap acceleration performance may be enhanced in proportion to the number of memory modules 830.

In the example of FIG. 8, the two memory controllers 811 and 813 may be provided with two DIMMs (or AxDIMMs) per channel, such that the CPU 810 may set a zSwap area to each DIMM, thereby performing zSwap acceleration in up to four DIMMs.

In the example of FIG. 9, a CPU 910 may include one memory controller 911. The CPU 910 may process data in a plurality of memory modules 930 through the one memory controller 911.

Depending on the CPU 810 or 910 and the board configuration, the topology of mountable DIMMs may vary.

A data processing apparatus (e.g., the data processing apparatus 10 of FIG. 1) may be configured inside or close to a memory module, thereby performing scalable AxDIMM zSwap acceleration in various configurations.

For scalable zSwap acceleration in various configurations, a zSwap backend interface of the host may generate a command separately for each DIMM accelerator unit mapped to a system memory, and input the generated command to a corresponding DIMM accelerator unit to operate the DIMM accelerator unit.

Figure 10:
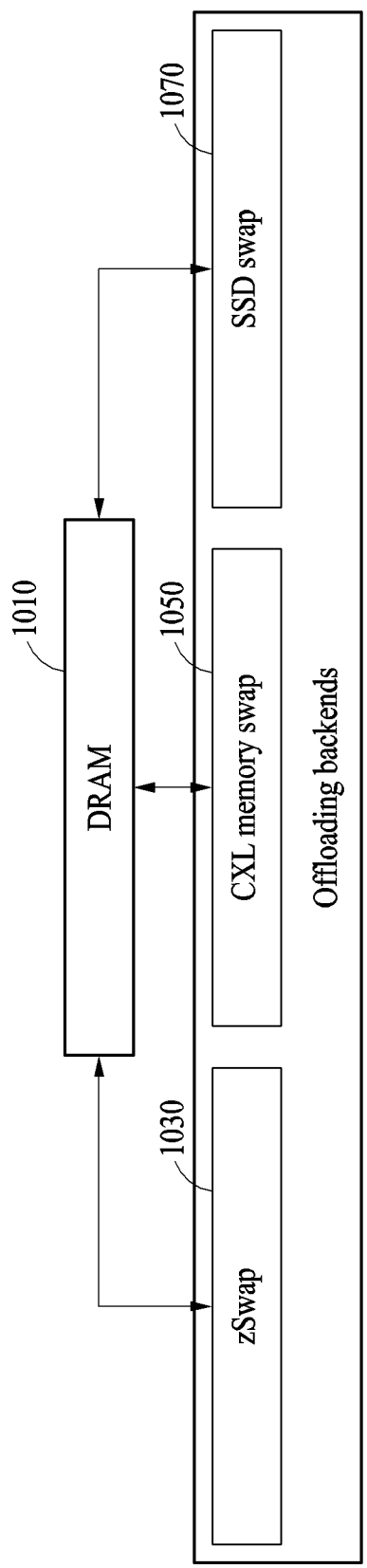
FIG. 10 illustrates an example of a zSwap structure in a heterogeneous memory.
Figure 11:
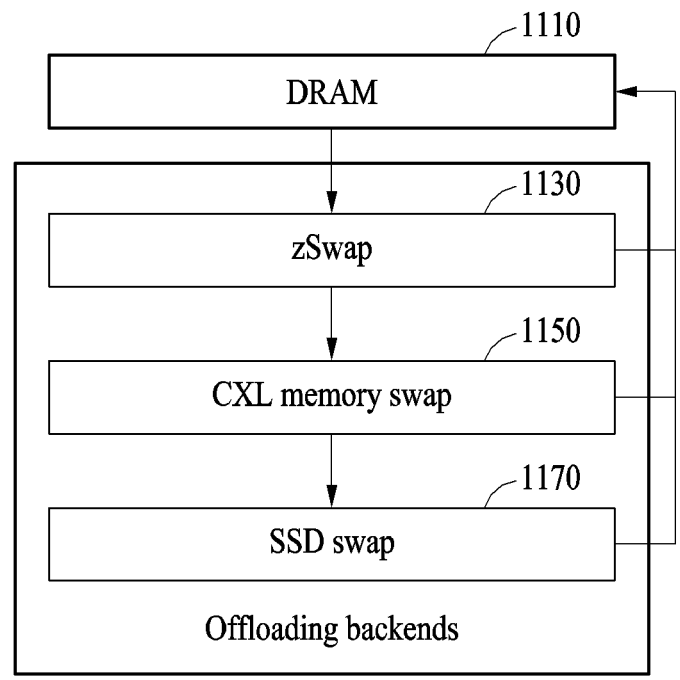
FIG. 11 illustrates an example of a zSwap structure in a heterogeneous memory.
Figure 12:
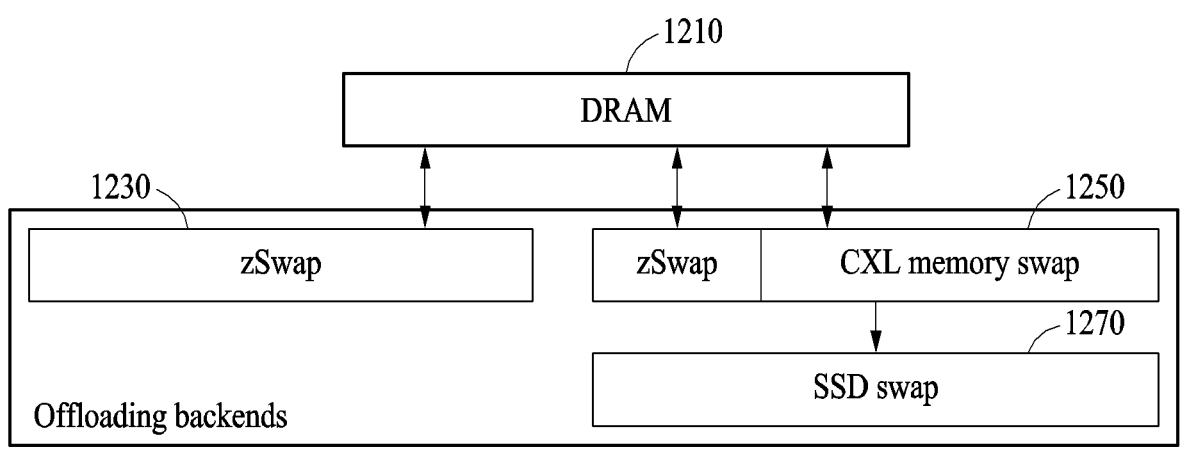
FIG. 12 illustrates an example of a zSwap structure in a heterogeneous memory.

FIGS. 10 to 12 illustrate examples of zSwap structures in a heterogeneous memory.

Referring to FIGS. 10 to 12, a zSwap structure in a heterogeneous memory may include a flat structure, a multi-level structure, and a hybrid structure, respectively.

The flat structure may be a structure in which a DRAM 1010, a zSwap 1030, a CXL memory swap 1050, and an SSD swap 1070 are arranged in a single layer. The flat structure may directly perform offloading to predetermined backends. For example, the DRAM 1010 may perform offloading of each of the zSwap 1030, the CXL memory swap 1050, and the SSD swap 1070.

The multi-level structure may be a structure in which offloading backends are arranged in several layers according to performance. For example, a zSwap 1130 may be at a lower layer of a DRAM 1110, a CXL memory swap 1150 may be at a lower layer of the zSwap 1130, and an SSD swap 1170 may be at a lower layer of the CXL memory swap 1150. In this case, offloading may be sequentially performed according to the layers. In the example of FIG. 11, offloading may be performed in the order of the DRAM 1110, the zSwap 1130, the CXL memory swap 1150, and the SSD swap 1170.

The hybrid structure may be a structure in which a flat structure and a multi-level structure are mixed. In this case, a zSwap 1230 and a CXL memory swap 1250 may be configured in a flat structure at a lower layer of a DRAM 1210, and the CXL memory swap 1250 and an SSD swap 1270 may be configured in a multi-level structure at a lower layer of the DRAM 1210.

A data processing apparatus (e.g., the data processing apparatus 10 of FIG. 1) may offload all or a portion of functions for zSwap acceleration to a plurality of near-memory acceleration units through various types of hierarchical structures, thereby accelerating zSwap.

Figure 13:
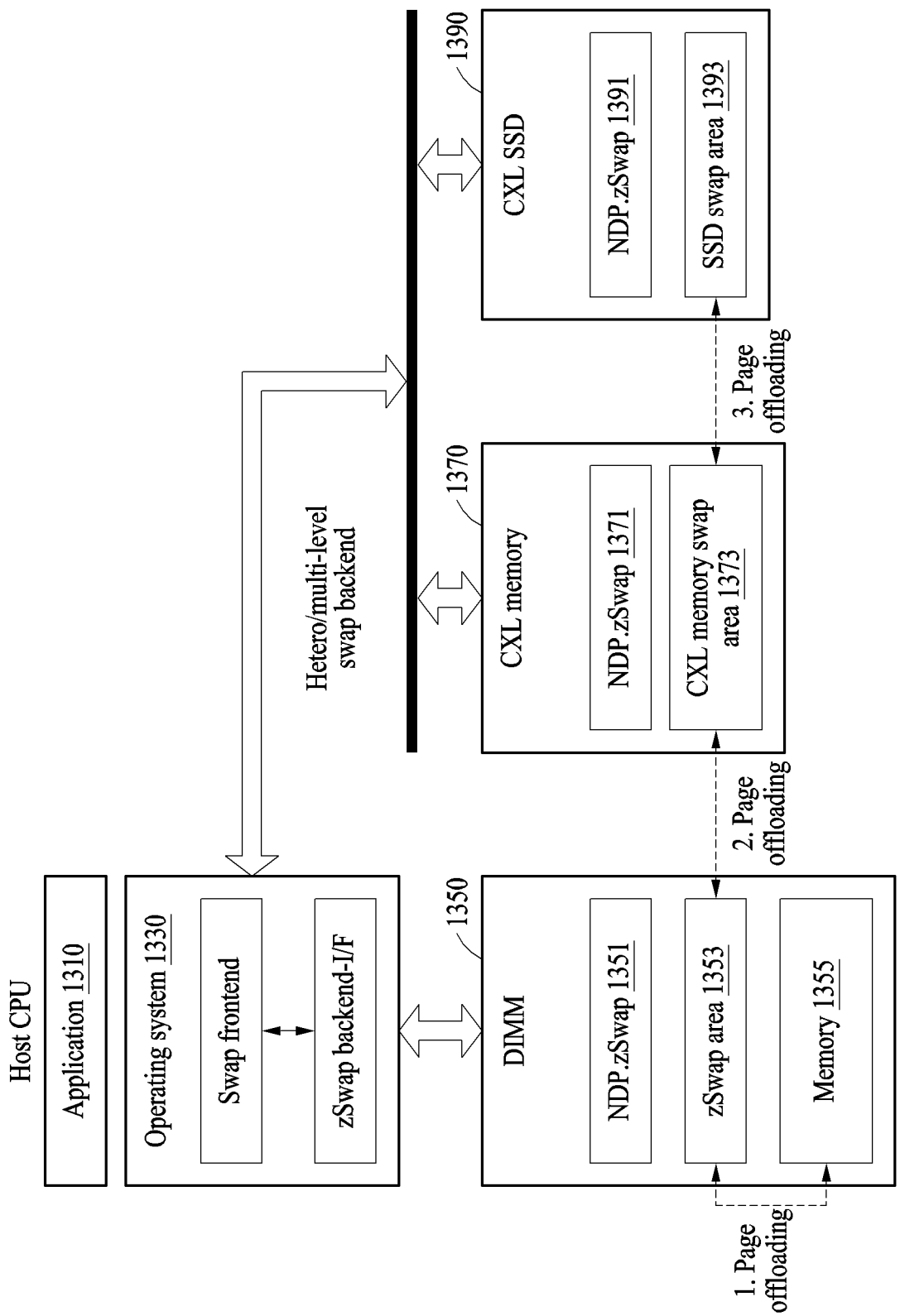
FIG. 13 illustrates an example of a multi-level swap backend configuration.

FIG. 13 illustrates an example of a multi-level swap backend configuration.

Referring to FIG. 13, a host CPU may execute an application program 1310 and an operating system 1330. The host CPU may perform zSwap acceleration through a plurality of memory modules (e.g., memory modules 1350, 1370, and 1390) having a multi-level swap backend structure.

The memory module 1350 may be implemented as a DIMM memory. The memory module 1350 may include a DIMM controller (NDP.zSwap) 1351, a zSwap area 1353, and a memory 1355. The memory module 1370 may be implemented as a CXL memory. The memory module 1370 may include a CXL memory controller (NDP.zSwap) 1371 and a CXL memory swap area 1373. The memory module 1390 may be implemented as a CXL/SSD memory. The memory module 1390 may include a CXL/SSD controller (NDP.zSwap) 1391 and an SSD swap area 1393.

The example of FIG. 13 may be an example of a multi-level swap backend configuration that uses CXL. In the example of FIG. 13, the DIMM memory module 1350 may be used as a main memory, the CXL memory module 1370 may be used as a secondary main memory, and CXL/SSD memory module 1390 may be used as a storage.

The zSwap area 1353, which is a compressed memory space, may be a partial area of the DIMM memory module 1350. The DIMM controller (NDP.zSwap) 1351 may use a dedicated accelerator unit (e.g., the data processing apparatus 10 of FIG. 1) for zSwap acceleration. Of pages of a memory, a page to be swapped-out may be first compressed in a near-memory processing zSwap of the DIMM memory module 1350 through the zSwap area 1353 and stored in a zpool, which is a compressed memory area.

When the compressed memory area is insufficient due to an increase in the memory load, the DIMM controller (NDP.zSwap) 1351 may select least accessed pages from among the pages allocated to the compressed memory and evict the selected pages to the CXL memory swap area 1373. In this case, the DIMM controller (NDP.zSwap) 1351 may reduce the memory bandwidth by transmitting the compressed pages from the zSwap area 1353 to the CXL memory.

Compressed data may be decompressed by a near-memory processing of the CXL controller (NDP.zSwap) 1371 and then stored in the CXL memory swap area 1373. The CXL controller (NDP.zSwap) 1371 may transmit the compressed pages to the CXL memory, and the CXL memory may decompress and store the pages. Through this, the CXL controller (NDP.zSwap) 1371 may prevent the corresponding memory from decompressing data when the memory is swapped-in to be used in an application program in the future, thereby reducing a degradation of the performance of the application program. The swap-in procedure may affect the performance of the application program. The swap-out procedure may be executed in the background asynchronously with the execution of the application program.

When the capacity is insufficient as the memory load of the swap space of the CXL memory increases, the CXL controller (NDP.zSwap) 1371 may evict less accessed pages to the swap area 1393 of the CXL/SSD and secure free space of the CXL memory, thereby preserving the performance.

Figure 14:
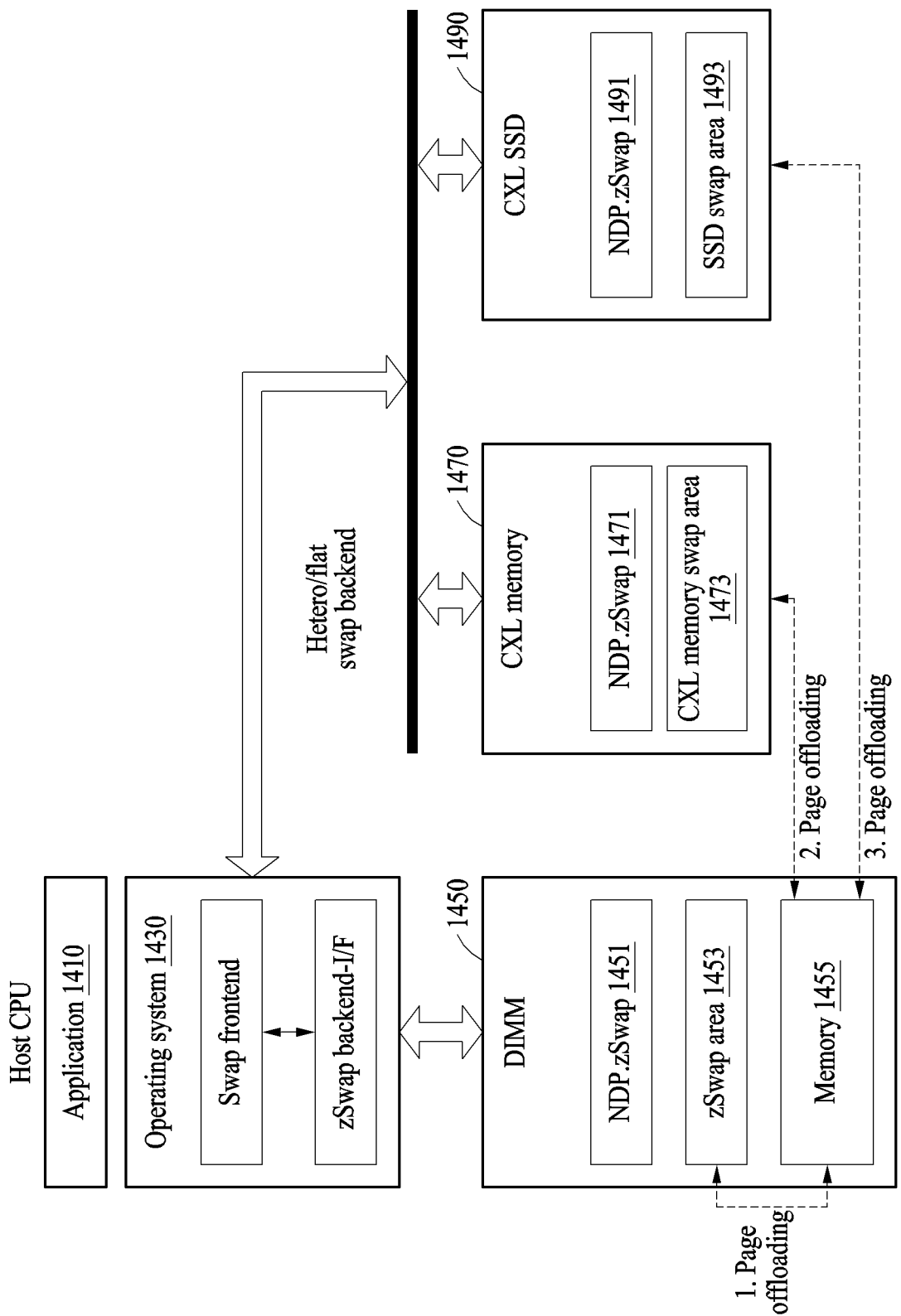
FIG. 14 illustrates an example of a flat swap backend configuration.

FIG. 14 illustrates an example of a flat swap backend configuration.

Referring to FIG. 14, a host CPU may execute an application program 1410 and an operating system 1430. The host CPU may perform zSwap acceleration through a plurality of memory modules (e.g., memory modules 1450, 1470, and 1490) having a flat swap backend structure.

The memory module 1450 may be implemented as a DIMM memory. The memory module 1450 may include a DIMM controller (NDP.zSwap) 1451, a zSwap area 1453, and a memory 1455. The memory module 1470 may be implemented as a CXL memory. The memory module 1470 may include a CXL memory controller (NDP.zSwap) 1471 and a CXL memory swap area 1473. The memory module 1490 may be implemented as a CXL/SSD memory. The memory module 1490 may include a CXL/SSD controller (NDP.zSwap) 1491 and an SSD swap area 1493.

In the example of FIG. 14, a flat swap backend structure may be implemented using a CXL memory. In this case, the DIMM memory module 1450, the CXL memory module 1470, and the CXL/SSD memory module 1490 may be used as swap devices of the same level.

The DIMM memory module 1450, the CXL memory module 1470, and the CXL/SSD memory module 1490 may have access latency differences according to characteristics of the respective devices and interfaces (e.g., a double data rate (DDR) bus and a peripheral component interconnect express (PCIe)) connected thereto. The DIMM memory module 1450 closest to the host CPU may have the shortest access latency, and the CXL memory module 1470 and the CXL/SSD memory module 1490 may have longer access latencies in that order.

To minimize the effect of the difference in the performance of swap devices on the performance of the application program 1410, offloading may be allocated to an appropriate swap device in consideration of the access characteristics of pages to be swapped-out.

For example, pages may be divided into three parts, which are as many as the swap devices, according to the access frequencies of the swap-out pages, and a page with the highest access frequency (e.g., a hot page) may be allocated to the zSwap area 1453 of the DIMM memory module 1450 which is the fastest. A page with the lowest access frequency (e.g., a cold page) may be stored in the SSD swap area 1493 which is the slowest.

Warm pages having access frequencies between the access frequency of the hot page and the access frequency of the cold page may be stored in the CXL memory swap area 1473 located in the middle. By allocating the pages to the swap devices separately according to the access frequencies of the pages, a degradation of the performance of an application program 1410 occurring due to access to a slow device may be minimized.

In a flat swap backend configuration, a compression function may be applied differently depending on the probability that swapped-out pages are accessed again. For example, hot pages stored in the zSwap area 1453 of the DIMM memory module 1450 which is the fastest have a high probability of being accessed again and thus, may be stored without compression, whereby the access latency may be minimized. Conversely, warm pages or cold pages having a low probability of being accessed again may be compressed and stored in respective swap areas.

Figure 15:
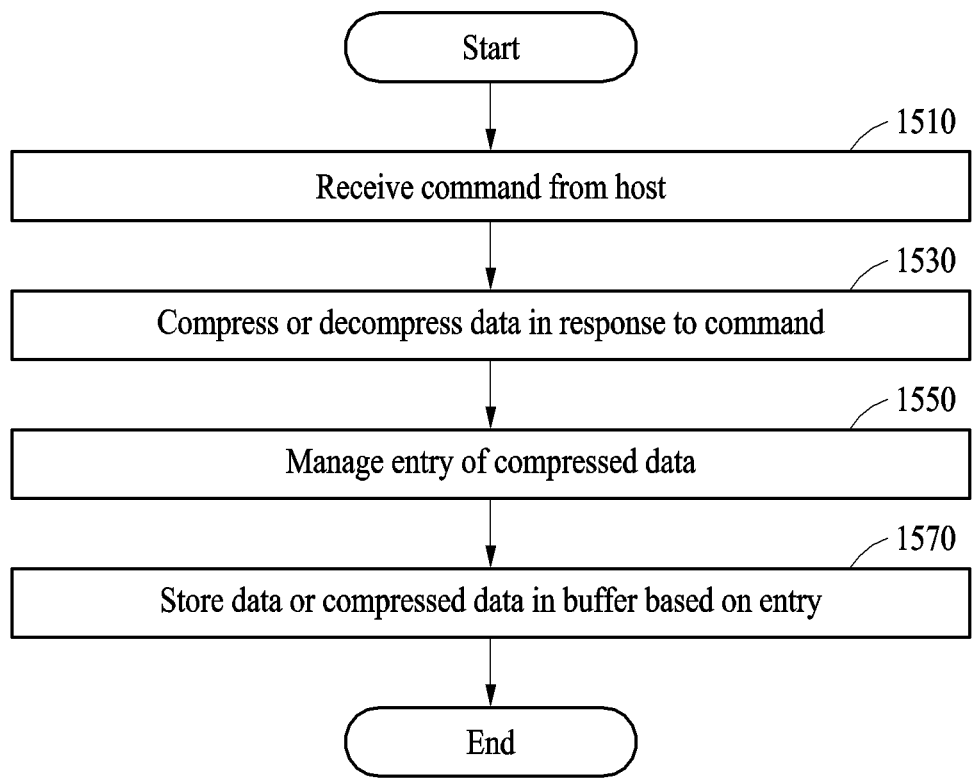
FIG. 15 illustrates an example of an operation of the data processing apparatus of FIG. 1.

FIG. 15 illustrates an example of an operation of the data processing apparatus of FIG. 1.

Referring to FIG. 15, in operation 1510, a near-memory processing unit (e.g., the near-memory processing unit 200 of FIG. 1) may receive a command from a host. The command may include a swap-in command and a swap-out command with respect to data or compressed data stored in a buffer (e.g., the buffer 300 of FIG. 1).

In operation 1530, the near-memory processing unit 200 may compress or decompress data in response to the command. In operation 1550, the near-memory processing unit 200 may manage an entry of the compressed data.

The near-memory processing unit 200 may generate an entry tree configured in a tree structure or a hash structure based on the compressed data. The near-memory processing unit 200 may manage the entry based on the entry tree.

The near-memory processing unit 200 may receive information on data stored in an input buffer from the host 100 and read the input buffer. The near-memory processing unit 200 may write the data to an output buffer and output information on the written data to the host 100.

In response to a swap-out command being received from the host 100, the near-memory processing unit 200 may set a swap-out parameter based on the swap-out command. The swap-out parameter may include a type of the data, an offset of the data, and whether to compress the data.

The near-memory processing unit 200 may determine whether to compress data based on the swap-out parameter. The near-memory processing unit 200 may allocate an area to store the compressed data.

The near-memory processing unit 200 may update the entry based on the swap-out parameter and the area to store the compressed data. The near-memory processing unit 200 may generate the entry based on an address of the area to store the compressed data, a type of the data, and an offset of the data. The near-memory processing unit 200 may update the entry by inserting the entry into the entry tree.

In response to a swap-in command being received from the host 100, the near-memory processing unit 200 may set a swap-in parameter based on the swap-in command. The near-memory processing unit 200 may retrieve the compressed data based on the swap-in parameter. The near-memory processing unit 200 may retrieve the compressed data based on a type of the compressed data and an offset of the compressed data.

The near-memory processing unit 200 may decompress the compressed data. The near-memory processing unit 200 may decompress the compressed data based on a decompression option of the compressed data included in the swap-in parameter.

The near-memory processing unit 200 may output the decompressed data to the host 100.

The near-memory processing unit 200 may delete an entry corresponding to the decompressed data from the entry tree.

In operation 1570, the near-memory processing unit 200 may store the data or the compressed data in the buffer 300 based on the entry.

The various elements in FIGS. 1-3 and 6-14 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 4-5 and 15 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and are not for purposes of limitation. Descriptions of features or aspects in each example are to be considered as being applicable to similar features or aspects in other examples. Suitable results may be achieved if the described techniques are performed in a different order and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A data processing apparatus spaced apart from a host and configured to process data in a memory in conjunction with the host, the data processing apparatus comprising:
   a near-memory processing unit configured to:
      receive a command from the host, compress or decompress the data in response to the command,
      generate, based on compressed data, an entry tree configured in a tree structure comprising top tree and bottom tree, wherein top tree is processed separately and the bottom tree comprise nodes as there are ranks to process data in parallel,
      manage an entry of the compressed data based on the entry tree; and
   a buffer configured to store the data or the compressed data based on the entry.

2. The data processing apparatus of claim 1, wherein the command comprises a swap-in command or a swap-out command with respect to the data or the compressed data stored in the buffer.

3. The data processing apparatus of claim 1, wherein the buffer comprises an input buffer and an output buffer, and
   the near-memory processing unit is further configured to receive information on data stored in the input buffer from the host and read the data from the input buffer, and write the data to the output buffer and output information on the written data to the host.

4. The data processing apparatus of claim 1, wherein the near-memory processing unit is further configured to, in response to a swap-out command being received from the host, set a swap-out parameter based on the swap-out command, determine whether to compress data based on the swap-out parameter, allocate an area to store the compressed data, and update the entry based on the swap-out parameter and the area.

5. The data processing apparatus of claim 4, wherein the swap-out parameter comprises a type of the data, an offset of the data, and whether to compress the data.

6. The data processing apparatus of claim 4, wherein the near-memory processing unit is further configured to generate the entry based on an address of the area, a type of the data, and an offset of the data, and update the entry by inserting the entry into an entry tree.

7. The data processing apparatus of claim 1, wherein the near-memory processing unit is further configured to, in response to a swap-in command being received from the host, set a swap-in parameter based on the swap-in command, retrieve the compressed data based on the swap-in parameter, decompress the compressed data, and output the decompressed data to a predetermined memory area.

8. The data processing apparatus of claim 7, wherein the near-memory processing unit is further configured to retrieve the compressed data based on a type of the compressed data and an offset of the compressed data.

9. The data processing apparatus of claim 7, wherein the near-memory processing unit is further configured to decompress the compressed data based on a decompression option of the compressed data included in the swap-in parameter.

10. The data processing apparatus of claim 7, wherein the near-memory processing unit is further configured to delete an entry corresponding to the decompressed data from an entry tree.

11. The data processing apparatus of claim 1, wherein the near-memory processing unit is further configured to store the data or the decompressed data in a near memory area.

12. A data processing method for processing data in a memory in conjunction with a host at a point spaced apart from the host, the data processing method comprising:
   receiving a command from the host;
   compressing or decompressing the data in response to the command;
   generating, based on compressed data, an entry tree configured in tree structure comprising top tree and bottom free, wherein top tree is processed separately and the bottom tree comprise nodes as there are ranks to process data in parallel,
   managing an entry of the compressed data based on the entry tree; and
   storing the data or the compressed data in a buffer based on the entry.

13. The data processing method of claim 12, wherein the command comprises a swap-in command or a swap-out command with respect to the data or the compressed data stored in the buffer.

14. The data processing method of claim 12, wherein the storing comprises:
   receiving information on data stored in an input buffer from the host and reading the data from the input buffer; and
   writing the data to the output buffer and outputting information on the written data to the host.

15. The data processing method of claim 12, wherein in response to a swap-out command being received from the host, the compressing or decompressing of the data comprises:
   setting a swap-out parameter based on the swap-out command; and
   determining whether to compress data based on the swap-out parameter, and the managing of the entry comprises:
   allocating an area to store the compressed data; and
   updating the entry based on the swap-out parameter and the area.

16. The data processing method of claim 15, wherein the swap-out parameter comprises a type of the data, an offset of the data, and whether to compress the data.

17. The data processing method of claim 15, wherein the updating of the entry comprises:
   generating the entry based on an address of the area, a type of the data, and an offset of the data; and
   updating the entry by inserting the entry into an entry tree.

18. The data processing method of claim 12, wherein the compressing or decompressing of the data comprises, in response to a swap-in command being received from the host:
   setting a swap-in parameter based on the swap-in command;
   retrieving the compressed data based on the swap-in parameter; and
   decompressing the compressed data, and
   the managing of the entry comprises outputting the decompressed data to a predetermined memory area.

19. The data processing method of claim 18, wherein the retrieving of the compressed data comprises retrieving the compressed data based on a type of the compressed data and an offset of the compressed data.

20. The data processing method of claim 18, wherein the decompressing comprises decompressing the compressed data based on a decompression option of the compressed data included in the swap-in parameter.

21. The data processing method of claim 18, wherein the managing of the entry further comprises deleting an entry corresponding to the decompressed data from an entry tree.

22. The data processing method of claim 12, further comprising storing the data or the decompressed data in a near memory area.

23. A non-transitory computer-readable storage medium storing instructions that, when executed by a processor, cause the processor to perform the data processing method of claim 12.

* * * * *